United States Patent
Mensah-Brown et al.

(10) Patent No.: US 9,573,474 B2
(45) Date of Patent: Feb. 21, 2017

(54) CAPACITOR PRECHARGING AND CAPACITANCE/RESISTANCE MEASUREMENT IN ELECTRIC VEHICLE DRIVE SYSTEM

(71) Applicant: FORD GLOBAL TECHNOLOGIES, LLC, Dearborn, MI (US)

(72) Inventors: Arnold K. Mensah-Brown, Canton, MI (US); Hasdi R. Hashim, Ann Arbor, MI (US); Bruce C. Blakemore, Plymouth, MI (US); Allan R. Gale, Livonia, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 491 days.

(21) Appl. No.: 14/198,981

(22) Filed: Mar. 6, 2014

(65) Prior Publication Data
US 2015/0251542 A1    Sep. 10, 2015

(51) Int. Cl.
*B60L 1/00* (2006.01)
*B60L 3/00* (2006.01)
*H02G 3/00* (2006.01)
*B60L 11/00* (2006.01)
*B60L 11/12* (2006.01)
*B60L 11/18* (2006.01)

(52) U.S. Cl.
CPC ............ *B60L 11/005* (2013.01); *B60L 11/12* (2013.01); *B60L 11/1803* (2013.01); *B60L 11/1851* (2013.01); *B60L 2270/20* (2013.01); *Y02T 10/7005* (2013.01)

(58) Field of Classification Search
CPC ............ B60L 11/1833; B60L 11/1853; B60L 11/1855; B60L 11/1859; B60L 11/1881; B60L 11/1887; B60L 15/007; B60L 2230/12
USPC ........................................ 307/10.1
See application file for complete search history.

(56) References Cited

U.S. PATENT DOCUMENTS

| | | | |
|---|---|---|---|
| 7,400,116 B2 * | 7/2008 | Kato | B60L 11/1803 320/166 |
| 7,538,990 B2 | 5/2009 | Belisle et al. | |
| 8,129,951 B2 | 3/2012 | Turner et al. | |
| 8,154,149 B2 | 4/2012 | King | |
| 8,203,810 B2 | 6/2012 | Bryan et al. | |
| 8,803,486 B2 * | 8/2014 | Norimatsu | H02M 1/36 307/10.1 |

(Continued)

FOREIGN PATENT DOCUMENTS

DE    10235431 A1    12/2004

*Primary Examiner* — Jared Fureman
*Assistant Examiner* — Esayas Yeshaw
(74) *Attorney, Agent, or Firm* — David B. Kelley; MacMillan, Sobanski & Todd, LLC

(57) ABSTRACT

An electric drive system for an electric vehicle has a DC power source and a contactor with an output coupled to a main bus and an input adapted to be connected to the DC power source. The contactor is selectably switched between an open state and a closed state. A link capacitor is coupled to the main bus. A precharge circuit is coupled between the DC power source and the link capacitor comprised of a controlled current source. The controlled current source is selectably activated with the contactor in the open state to charge the link capacitor to a predetermined voltage to before switching the contactor to the closed state.

16 Claims, 5 Drawing Sheets

(56) References Cited

U.S. PATENT DOCUMENTS

| | | | |
|---|---|---|---|
| 2006/0071557 A1* | 4/2006 | Osawa | B60L 3/0046 |
| | | | 307/10.1 |
| 2007/0029975 A1* | 2/2007 | Martin | H02J 7/0068 |
| | | | 320/134 |
| 2007/0159007 A1* | 7/2007 | King | B60L 11/1864 |
| | | | 307/71 |
| 2008/0092258 A1* | 4/2008 | Clarke | B60L 1/003 |
| | | | 307/10.1 |
| 2010/0277845 A1 | 11/2010 | Park et al. | |
| 2011/0309809 A1 | 12/2011 | Rao et al. | |
| 2012/0249334 A1* | 10/2012 | Dao | H04Q 9/00 |
| | | | 340/636.1 |
| 2013/0234508 A1* | 9/2013 | Eisele | H02J 7/0013 |
| | | | 307/9.1 |
| 2015/0084404 A1* | 3/2015 | Hashim | B60L 11/18 |
| | | | 307/9.1 |

* cited by examiner

CAPACITOR PRECHARGING AND CAPACITANCE/RESISTANCE MEASUREMENT IN ELECTRIC VEHICLE DRIVE SYSTEM

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to drive systems for electric vehicles, and, more specifically, to improved precharging of a main DC bus link capacitor.

Electric vehicles, such as hybrid electric vehicles (HEVs) and plug-in hybrid electric vehicles (PHEVs), use inverter-driven electric machines to provide traction torque and regenerative braking torque. Such inverters typically employ an energy storage capacitor (or the main capacitor) as the DC link for a main DC bus, which is usually interfaced with the high-voltage (HV) power source such as a battery through a variable voltage converter (VVC), an input capacitor, and a pair of mechanical contactors (e.g., relays). An inverter and other loads are driven from the main DC bus.

If the contactors are initially closed with the link capacitor in a discharged or low charged state, a low impedance from the HV DC source to the main DC bus can result in a very high inrush current that could cause damage to the contactors and other components. Use of a current-limiting resistor in series with the contactors is undesirable because of the associated voltage drop and power consumption during subsequent normal operation. Therefore, a separate circuit branch, or precharging circuit, is often used. The known precharging circuits utilize a switch and a resistor in series between the DC supply and the link capacitor. Turning on the switch allows the link capacitor to be charged through the resistor, and the presence of the resistor limits the inrush current to prevent damage to the switch. Once the link capacitor is precharged, then i) the main contactors can be closed without receiving any inrush current and ii) the precharge switch can be opened so that the precharge resistor is disconnected.

It is desirable to complete the precharging process in a short amount of time so that the vehicle can be driven immediately after the driver activates it. The charging time of the capacitor in the conventional arrangement is governed by the RC time constant of the precharging circuit and link capacitor. Since the precharging resistor must be large enough to limit inrush current and the link capacitor necessarily has a relatively large capacitance, an undesirably long delay has sometimes occurred. Furthermore, the presence of additional loads on the main DC bus can affect the precharging by increasing the impedance. For example, a bleeder resistor is typically present across the link capacitor to discharge the link capacitor during shutdown of the electric drive. Other possible loads include an electric (PTC) heater. The loads may further prolong the precharging time.

The effective resistances of the loads may change over time, and some loads such as an electric heater could be switched on or off when performing a precharge. The capacitance of the link capacitor may also degrade over time. These variations have made it more difficult to ensure that a precharge is completed within a predictable amount of time.

For diagnostic and monitoring purposes, it is desirable to measure the capacitance and resistance associated with the main DC bus throughout the lifetime of the electric drive. Dedicated components have typically been required in order to perform these measurement functions. It would be desirable to perform such measurements without requiring dedicated components.

SUMMARY OF THE INVENTION

In one aspect of the invention, an electric drive system is provided for an electric vehicle with a DC power source. A contactor has an input adapted to be connected to the DC power source and has an output. The contactor is selectably switched between an open state and a closed state. A main bus is coupled to a link capacitor and the output of the contactor. A precharge circuit is coupled between the DC power source and the link capacitor comprised of a controlled current source. The controlled current source is selectably activated with the contactor in the open state to charge the link capacitor to a predetermined voltage before switching the contactor to the closed state.

DETAILED DESCRIPTION OF PREFERRED EMBODIMENTS

Figure 1:
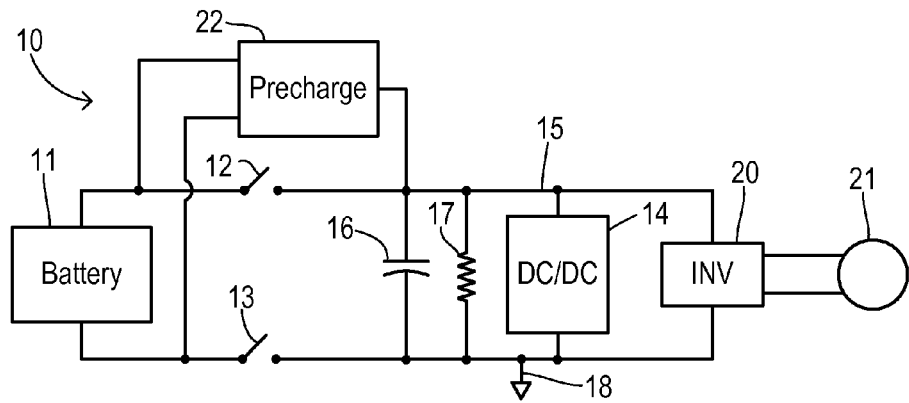
FIG. 1 is a schematic diagram showing the general arrangement of a precharging circuit.

Referring now to FIG. 1, an electric vehicle drive system 10 includes a DC power source 11 (such as a battery pack or a fuel cell) coupled by contactor switches 12 and 13 to a variable voltage DC-to-DC converter 14. Contactors 12 and 13 are preferably mechanical switches having an open state and a closed state for selectively coupling battery 11 to a main DC bus 15 (via converter 14).

A link capacitor 16 and bleed resistor 17 are coupled between main DC bus 15 and a main ground 18. An inverter load 20 has an input connected to bus 15 and an output connected to an electric motor 21. A precharge circuit 22 is coupled between battery 11 and link capacitor 16 in order to supply a charge onto link capacitor 16 during startup of electric drive 10 so that when contactors 12 and 13 are closed, they are not damaged by an inrush current.

In the present invention, precharge circuit 22 implements a controlled-current strategy which can better assure a fast precharging time even in the event of a variable impedance at the main DC bus. In a preferred embodiment, precharge circuit 22 comprises a controlled current source which delivers a substantially constant precharging current (at least during a substantial portion of the precharging time until the rising link capacitor voltage reduces the current drawn from the precharge circuit).

Figure 2:
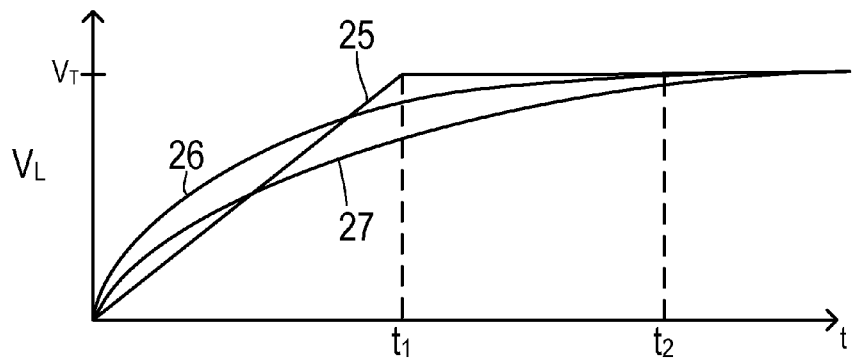
FIG. 2 is a graph comparing the precharging time for the constant current precharging of the present invention versus prior art RC precharging.

FIG. 2 compares the ramping up of a voltage $V_L$ across the link capacitor when using constant current versus RC-controlled precharging. A trajectory 25 shows a linear voltage increase that results from a constant precharging current. The slope of the voltage rise is substantially constant until reaching a threshold voltage $V_T$ at a time $t_1$. Trajectories 26 and 27 represent typical precharging times when using an RC precharging circuit. For example, trajectory 26 achieves a precharge only after a longer delay time $t_2$.

Figure 3:
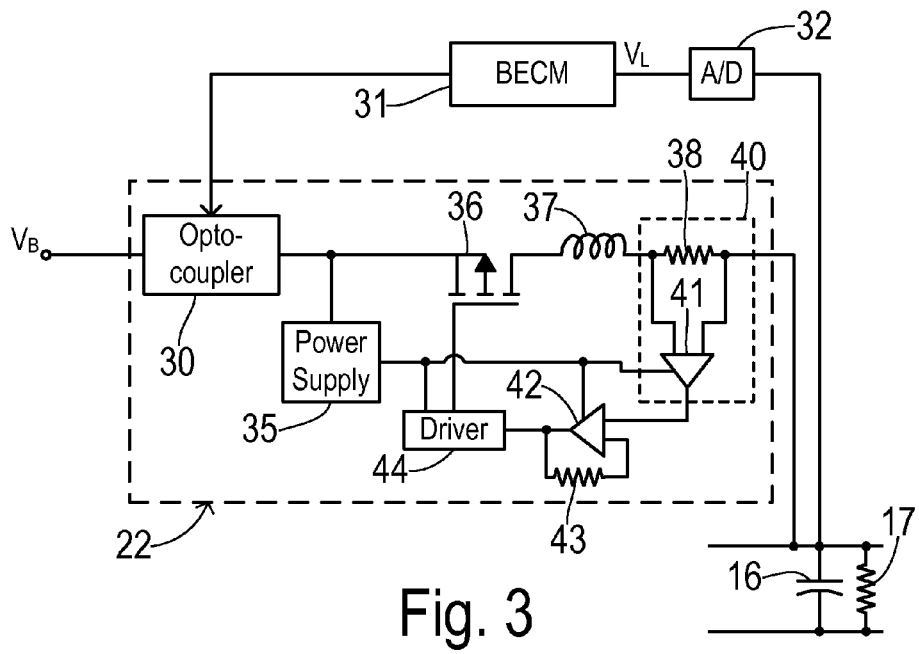
FIG. 3 is a block diagram showing a precharging circuit and control circuit for one preferred embodiment of the invention.

FIG. 3 shows an embodiment of precharge circuit 22 in greater detail wherein an optocoupler 30 receives a battery voltage $V_B$. Optocoupler 30 is normally turned off. A battery energy control module (BECM) 31 provides an activation signal to optocoupler 30 to initiate a precharging event when a driver attempts to activate the electric drive, for example. BECM 31 may be comprised of a special-purpose integrated circuit chipset (such as the TB9141FG and TMPM358FDTFG Li-ion battery monitor chipset from Toshiba America Electronic Components, Inc. of Irvine, Calif.) with or without a host controller (e.g., a general purpose microcontroller integrated circuit) to determine the need for closing of the contactors. A voltage sensor comprised of an analog-to-digital (A/D) converter 32 provides a link capacitor voltage measurement $V_L$ to BECM 31. Alternatively, converter 32 may be incorporated within BECM 31. In response to initiating a start up of the electric drive system, BECM 31 provides a precharge initiation command to optocoupler 30 to turn it on. This connects a battery voltage $V_B$ to a power supply 35 and the source terminal of a MOSFET 36. Power supply 35 generates a voltage suitable for the semiconductor components used within precharge circuit 22 (e.g., 5 volts).

MOSFET 36 is connected in series with an inductor 37 for supplying a controlled current through a current-sense resistor or shunt 38 to link capacitor 16. Current sense resistor 38 forms part of a current sensor 40 also containing a differential amplifier 41 receiving power from power supply 35. Differential amplifier 41 generates an output signal proportional to the current flowing through inductor 37 which is provided to an input of a Schmitt trigger formed by a comparator 42 and a positive feedback resistor 43. A MOSFET driver 44 powered by power supply 35 is connected to the gate of MOSFET 36 in order to turn MOSFET 36 on or off according to the output state of trigger 42.

Figure 4:
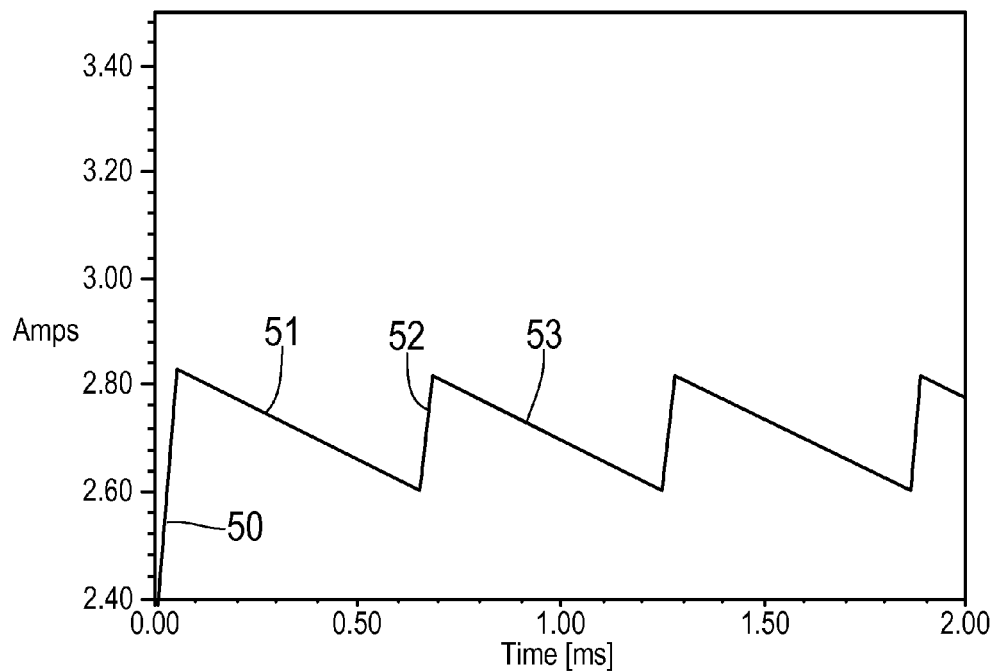
FIG. 4 is a graph showing one embodiment of a substantially constant current magnitude using a pulse-width modulation technique.

Schmitt trigger 42 is configured to activate driver 44 and MOSFET 36 to attempt to build up the current in inductor 37 during times when the measured inductor current is below a first threshold and to deactivate driver 44 and MOSFET 36 when the measured inductor current is above a second threshold, wherein the second threshold is higher than the first threshold. In essence, trigger 42 performs pulse-width modulation (PWM) switching of MOSFET 36 in order to obtain a substantially constant current as shown in FIG. 4. In this example, inductor current is controlled between a lower threshold of 2.6 amps and an upper threshold of 2.82 amps. When the MOSFET first turns on, current rapidly increases along a line in 50 to the upper threshold. At the upper threshold, the MOSFET is turned off and the current ramps down along a line 51 to the lower threshold, causing the MOSFET to again turn on. Current again increases to the upper threshold along a line 52 until the upper threshold is reached and the trigger turns off the MOSFET so that current again ramps down along a line 53. Thus, the controlled-current source provides a substantially constant precharging current having a desired RMS value (e.g., about 2.7 A in FIG. 4).

Since the upper and lower current thresholds are constant, the precharging current is substantially constant (i.e., with small fluctuations around the RMS value). Other (i.e., non-constant) current trajectories could also be obtained by varying the upper and/or lower thresholds during the precharging time.

Figure 5:
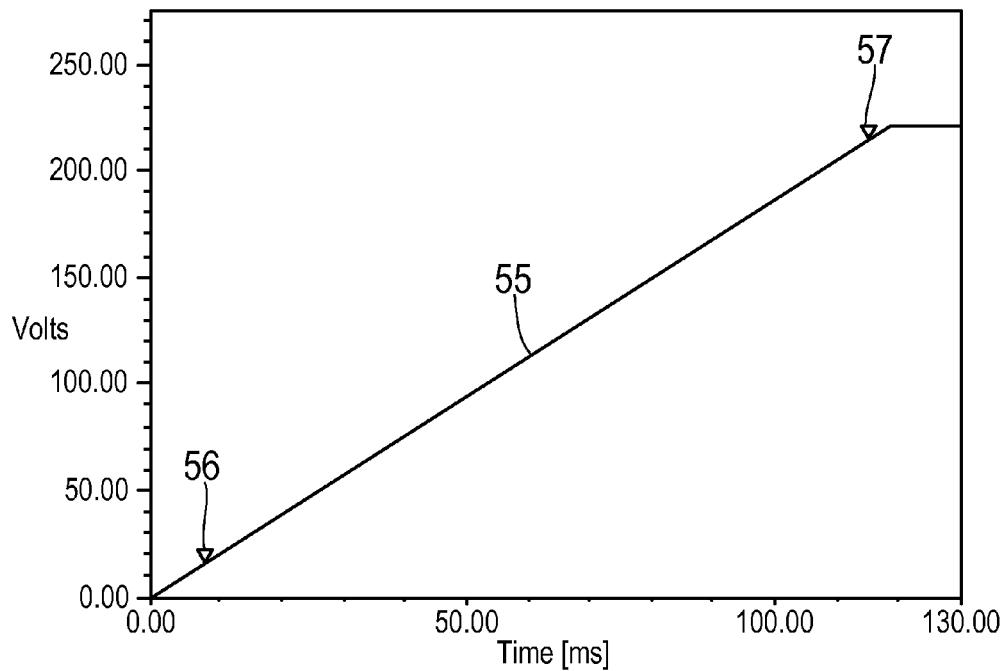
FIG. 5 is a graph showing a link capacitor voltage during precharging according to one preferred embodiment.

FIG. 5 shows a trajectory 55 of a precharging voltage measured across the link capacitor at the main DC bus during the time that the link capacitor is being quickly precharged by the constant current source. As shown, the precharging is accomplished in this example in less than about 120 ms. In addition to a fast and predictable precharging time, the present invention provides an opportunity for easily determining the impedance into which the precharging current is flowing (e.g., the link capacitor capacitance and/or the load resistances including a bleed resistor).

The interaction between the precharging circuit with the main bus impedances during precharging is given by:

$$i = C\frac{dv}{dt} + \frac{v}{R}$$

where i is current from the precharge circuit, C is capacitance receiving the current, v is the bus voltage, and R is the resistance receiving the current. During the precharging time in which current i is substantially constant, voltage v is as follows:

$$v = \frac{dv}{dt} \cdot t.$$

Thus, for times close to zero, the first equation reduces to:

$$C = \frac{i}{\frac{dv}{dt}}$$

which allows the present invention to characterize the link capacitance during the precharge. Solving the first equation for R, gives:

$$R = \frac{\frac{dv}{dt} t}{i - C\frac{dv}{dt}}$$

so that the value derived for the capacitance can be used to characterize the bus resistance. Thus, by monitoring the voltage rise at the link capacitor during constant-current precharging and by noting the slope (i.e., the voltage change and the elapsed time), the capacitance and resistance values are calculated. The BECM or other control circuit samples a link voltage 56 at a first time (i.e., the beginning of the elapsed time) and a link voltage 57 at a second time (i.e., the ending of the elapsed time). The difference in voltage and the difference in time provides the slope dv/dt. Abnormal conditions can then be detected based on either abnormal values for the slope or the resulting capacitance or resistance values. In addition, the measured values can be used in the control circuit(s) to detect the presence or absence of various optional loads that would have a predetermined impact on the resistance at the main DC bus.

Figure 6:
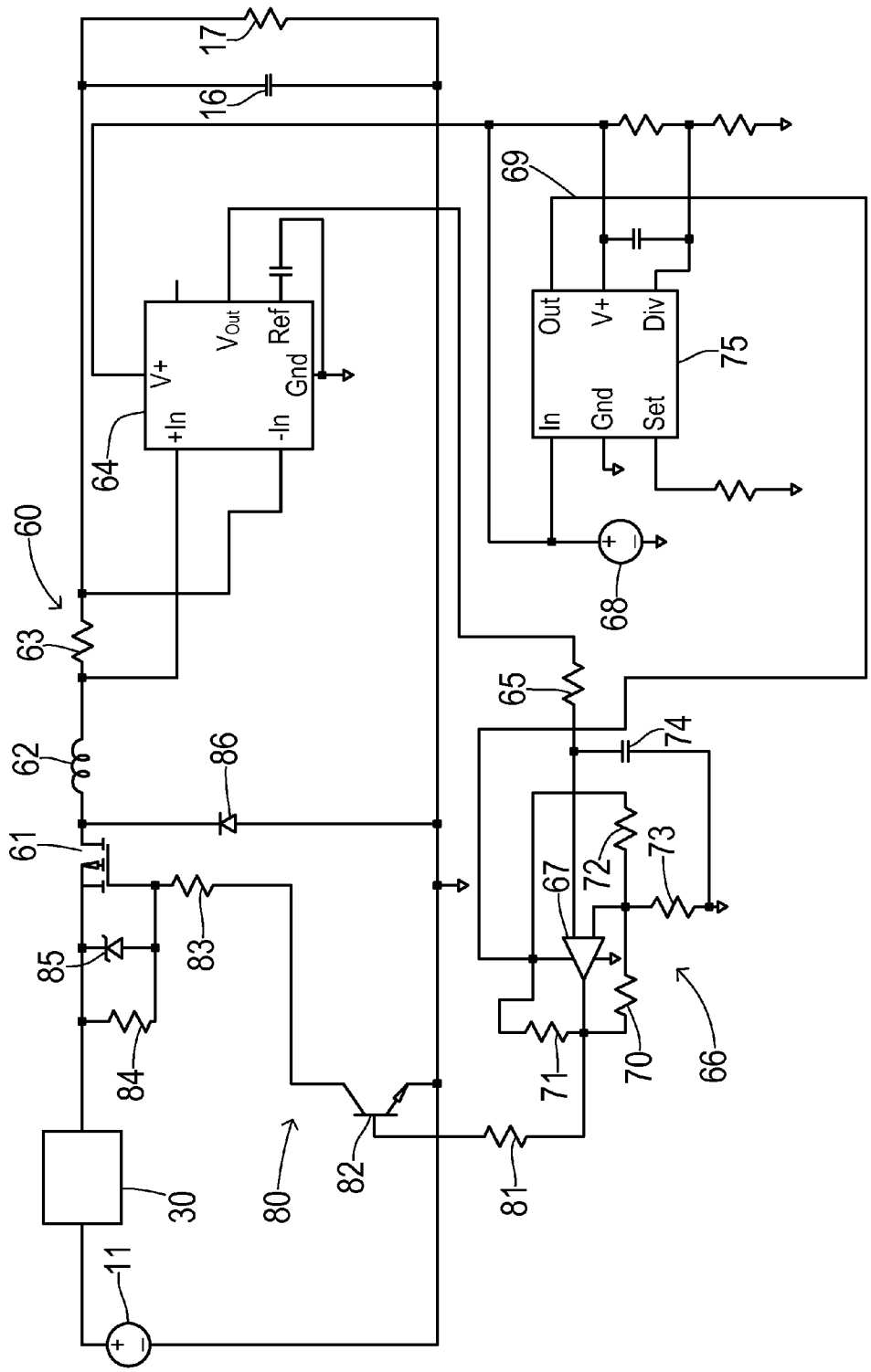
FIG. 6 is a schematic diagram showing another preferred embodiment of a precharging circuit in greater detail.

FIG. 6 shows a precharging circuit 60 in greater detail. A MOSFET 61 is selectably connected to the high voltage DC supply (battery) 11 through optocoupler 30. Inductor 62 connected in series with MOSFET 61 supplies the precharge current to link capacitor 16 through a shunt resistor 63. Resistor 63 is connected to a current sense amplifier integrated circuit 64 (such as an LT1999 chip from Linear Technology). A measured-current output signal from IC 64 is provided to a trigger circuit 66 through a coupling resistor 65.

Precharge circuit 60 includes a power supply 68 is also activated by the main DC supply when optocoupler 30 is closed (via a connection not shown). A regulated output from power supply 68 is coupled to current-sense chip 64 and as an input to a delay chip 75 (such as an LTC6994 available from Linear Technology). A delayed output 69 from chip 75 is used to supply regulated power to trigger circuit 66 in order to ensure that the sensed current is available before powering up trigger circuit 66.

Schmitt trigger circuit 66 includes a comparator 67 with an inverting input (i.e., sense input) receiving the measured current signal via resistor 65. The non-inverting input of comparator 67 determines a hysteresis band (i.e., the lower and upper thresholds) via a positive feedback network including resistors 70, 72, and 73 and a capacitor 74. Resistor 71 is a pull-up resistor. A binary output of trigger circuit 66 is coupled to a FET driver 80 via a coupling resistor 81. Driver 80 includes the transistor 82 coupled to the gate of MOSFET 61 via a coupling resistor 83. Resistor 84 and Zener diode 85 help bias MOSFET 61. A freewheeling diode 86 is connected between ground and inductor 62 to provide a path for the inductor current when MOSFET 61 turns off.

Figure 7:
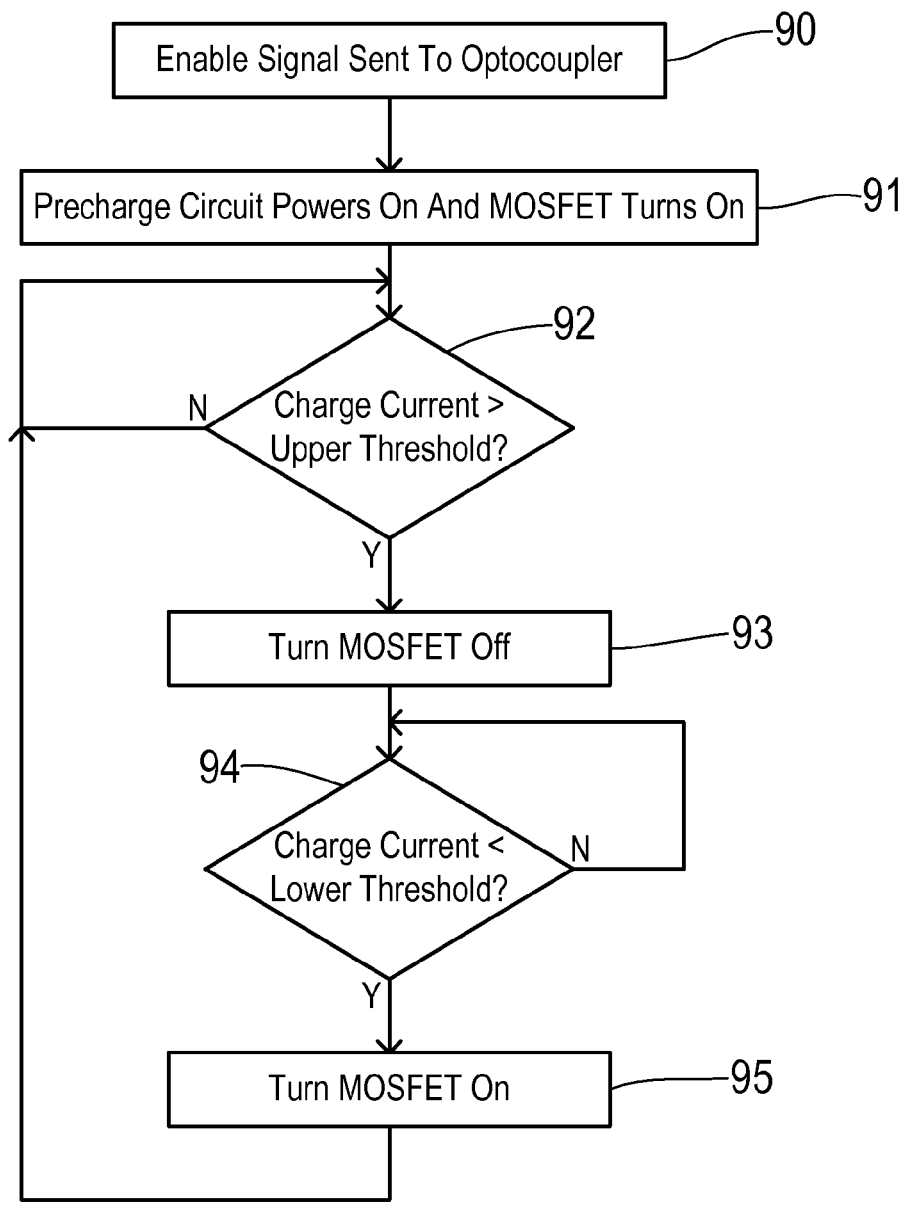
FIG. 7 is a flowchart showing one preferred method of controlling the precharging current.

FIG. 7 shows a preferred method for providing a substantially constant precharging current. In step 90, an enable signal is sent to the optocoupler from a control circuit (e.g., a battery energy control module). When the optocoupler turns on, the precharge circuit powers on and the MOSFET turns on in step 91. In step 92, a check is performed to determine whether the charge current is greater than the upper threshold. If not, then the MOSFET remains on and the charge current is re-checked in step 92. When charge current exceeds the upper threshold, then the MOSFET is turned off in step 93. With the MOSFET turned off, a check is performed in step 94 to determine whether the charge current has dropped below the lower threshold. If not, then be MOSFET remains off and the check in step 94 is repeatedly performed. When charge current drops below the lower threshold, then the MOSFET is turned on in step 95 and a return is made to step 92. As the link capacitor becomes fully charged, the constant current cannot be maintained by the precharging circuit. Nevertheless, the MOSFET can remain on since the current automatically extinguishes. The MOSFET eventually turns off when the control circuit turns off the optocoupler.

Figure 8:
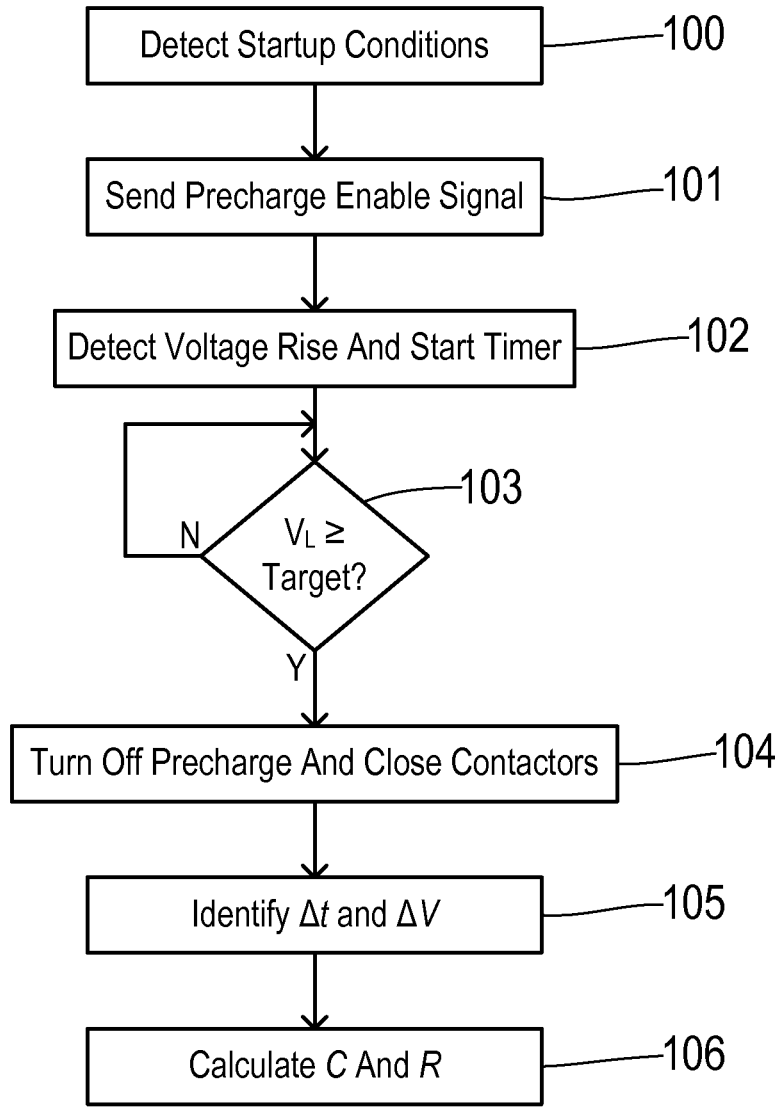
FIG. 8 is a flowchart showing a preferred method for performing a precharging function while determining a capacitance and a resistance as measured from the main DC bus during the precharging process.

A preferred method for the overall operation of the electric drive system for performing a precharge and characterizing main bus capacitance and resistance is shown in FIG. 8. Startup conditions are detected in step 100, and then a precharge enable signal is sent from the control circuit in step 101. After sending the precharge enable signal, the controller monitors the link voltage in step 102 (e.g., it starts a timer and stores a sample time and sample voltage at the beginning of the precharge). In step 103, the link voltage is compared to a predetermined target voltage. During this comparison phase, an additional sample is stored which represents the ending of the elapsed time for the precharge measurements. When the link voltage is equal to or greater than the target voltage, then the method proceeds in step 104 to turn off the precharge circuit and to close the main contactors. In step 105, the elapsed time and change in voltage are identified and are used in step 106 to calculate the capacitance and resistance values.

What is claimed is:

1. An electric drive system for an electric vehicle with a DC power source, comprising:
    a contactor having an input adapted to be connected to the DC power source and having an output, wherein the contactor is selectably switched between an open state and a closed state;
    a link capacitor;
    a main bus coupled to the output of the contactor and the link capacitor;
    a precharge circuit adapted to be coupled between the DC power source and the link capacitor, wherein the precharge circuit is comprised of a controlled current source that is selectably activated with the contactor in the open state to charge the link capacitor to a predetermined voltage before switching the contactor to the closed state.

2. The drive system of claim 1 wherein the precharge circuit is comprised of:
    an inductor;
    a transistor switch connected in series with the inductor for selectably connecting the inductor to the DC power source; and
    a control circuit for driving the transistor switch so that the inductor supplies a substantially constant current during precharging of the link capacitor.

3. The drive system of claim 2 wherein the control circuit is comprised of:
    a current sensor measuring an inductor current; and
    a trigger that turns on the transistor switch when the measured inductor current is below a first threshold and turns off the transistor switch when the measured inductor current is above a second threshold, wherein the second threshold is higher than the first threshold.

4. The drive system of claim 1 further comprising:
    a voltage sensor measuring a link voltage across the link capacitor; and
    a control circuit initiating precharging of the link capacitor by enabling the precharge circuit, monitoring the measured link voltage, and terminating the precharging by disabling the precharge circuit when the measured link voltage is greater than a voltage threshold.

5. The drive system of claim 4 wherein the control circuit determines a capacitance of the link capacitor in response to an elapsed time of precharging and a slope of the measured link voltage.

6. The drive system of claim 5 wherein the slope is comprised of a difference between a measured link voltage corresponding to a beginning of the elapsed time and a measured link voltage corresponding to an ending of the elapsed time.

7. The drive system of claim 5 wherein the controlled current is a constant current, and wherein the control circuit determines the capacitance according to the constant current divided by the slope.

8. The drive system of claim 4 wherein the controlled current is a constant current, and wherein the control circuit determines a resistance in parallel with the link capacitor in response to an elapsed time of precharging, a slope of the measured link voltage, and the constant current.

9. A method of precharging a link capacitor on a main bus in an electric vehicle drive, comprising:
activating a precharge circuit to supply a substantially constant current to the link capacitor with a main battery contactor in an open state;
deactivating the precharge circuit when the link capacitor voltage reaches a predetermined voltage; and
closing the contactor.

10. The method of claim 9 further comprising:
pulse-width modulating a transistor switch in series with an inductor for supplying the substantially constant current.

11. The method of claim 9 further comprising:
measuring a link voltage across the link capacitor; and
determining a capacitance of the link capacitor in response to an elapsed time of precharging and a slope of the measured link voltage.

12. The method of claim 11 wherein the slope is comprised of a difference between a measured link voltage corresponding to a beginning of the elapsed time and a measured link voltage corresponding to an ending of the elapsed time.

13. The method of claim 12 wherein the capacitance is determined according to the constant current divided by the slope.

14. The method of claim 9 further comprising:
measuring a link voltage across the link capacitor; and
determining a resistance in parallel with the link capacitor in response to an elapsed time of precharging, a slope of the measured link voltage, and the constant current.

15. A precharge circuit for charging a main bus link capacitor in an electric vehicle drive, comprising:
an inductor;
a transistor selectably coupling the inductor to a DC supply;
a current sensor measuring an inductor current; and
a trigger turning on the transistor when the inductor current is below a first threshold and turning off the transistor when the inductor current is above a second threshold which is higher than the first threshold.

16. The precharge circuit of claim 15 further comprising:
an optocoupler connecting the transistor to the DC supply, wherein the optocoupler is adapted to be controlled remotely by a control circuit of the electric vehicle drive.

* * * * *